(12) United States Patent
Duty et al.

(10) Patent No.: US 11,603,020 B2
(45) Date of Patent: Mar. 14, 2023

(54) ELECTRICAL ENERGY MANAGEMENT OF HEAT TRANSFER DEVICES FOR VEHICLES

(71) Applicants: Mark J Duty, Goodrich, MI (US); Daniel R King, Brockway, MI (US); Shantanu Ajankar, Sterling Heights, MI (US); Yugandhara P Joshi, Sterling Heights, MI (US)

(72) Inventors: Mark J Duty, Goodrich, MI (US); Daniel R King, Brockway, MI (US); Shantanu Ajankar, Sterling Heights, MI (US); Yugandhara P Joshi, Sterling Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 523 days.

(21) Appl. No.: 16/676,631

(22) Filed: Nov. 7, 2019

(65) Prior Publication Data

US 2021/0138939 A1    May 13, 2021

(51) Int. Cl.
  *B60N 2/56*    (2006.01)
  *B60R 1/06*    (2006.01)
  *B62D 1/06*    (2006.01)
  *B60S 1/02*    (2006.01)
  *B60L 58/26*   (2019.01)

(52) U.S. Cl.
  CPC ............ *B60N 2/56* (2013.01); *B60R 1/0602* (2013.01); *B60S 1/023* (2013.01); *B62D 1/065* (2013.01); *B60L 58/26* (2019.02)

(58) Field of Classification Search
  CPC ........ B60N 2/56; B60R 1/0602; B60S 1/023; B62D 1/065; B60L 58/26
  See application file for complete search history.

(56) References Cited

U.S. PATENT DOCUMENTS

| | | | |
|---|---|---|---|
| 6,892,807 B2 | 5/2005 | Fristedt et al. | |
| 8,002,344 B2 | 8/2011 | Abe et al. | |
| 9,310,112 B2 | 4/2016 | Bell et al. | |
| 9,676,310 B2 | 6/2017 | Fitzpatrick et al. | |
| 10,216,258 B1* | 2/2019 | Hornback | G05D 23/27 |
| 10,232,733 B2* | 3/2019 | Wu | B60L 53/00 |
| 2012/0222438 A1* | 9/2012 | Osaka | B60H 1/00764 62/126 |
| 2013/0134150 A1* | 5/2013 | Mizuno | B60N 2/5685 219/202 |
| 2016/0082861 A1* | 3/2016 | Gauthier | B60L 58/26 165/287 |
| 2018/0056941 A1* | 3/2018 | Won | B60S 1/026 |

FOREIGN PATENT DOCUMENTS

JP    2010264936 A    11/2010

* cited by examiner

*Primary Examiner* — Gordon A Jones
(74) *Attorney, Agent, or Firm* — Ralph E. Smith

(57) ABSTRACT

Energy management techniques for heating or cooling a surface of a component of a vehicle comprise determining a heating lag time indicative of a lag time for a surface element of the vehicle component to heat to a first target temperature in response to a power on-off or power off-on modulation of a heat transfer component, determining a cooling lag time indicative of a lag time for the surface element to cool to a second target temperature in response to a power on-off or power off-on modulation of the heat transfer component, and controlling power-on and power-off times of the heat transfer component based on the determined heating and cooling lag times so as to not require a temperature sensor for feedback-based temperature control.

9 Claims, 4 Drawing Sheets

ELECTRICAL ENERGY MANAGEMENT OF HEAT TRANSFER DEVICES FOR VEHICLES

FIELD

The present application generally relates to vehicle heat transfer devices and, more particularly, to electrical energy management of heated and cooled surface devices for vehicles.

BACKGROUND

A vehicle heat transfer device includes a heat transfer component (electrical heating element, a cooling compressor/pump, a cooling fan, etc.) that is configured to generate and provide heat energy to or remove heat energy from a surface formed of a material to be heated/cooled. Conventional vehicle heated surface devices, for example, typically operate by a controller commanding the temperature of the electrical heating element to a target temperature of the surface and then maintaining electrical heating element at this target temperature. This approach consumes energy directly proportional to the power of the electrical heating element and the time the electrical heating element is active or "powered-on" and is generating heat energy to heat the surface material. The same could also be true for cooled surface devices. Therefore, this conventional approach could potentially result in excessive power consumption. Accordingly, while such conventional vehicle heat transfer devices do work well for their intended purpose, there remains a need for improvement in the relevant art.

SUMMARY

According to one example aspect of the invention, a system for heating or cooling a surface of a component of a vehicle is presented. In one exemplary implementation, the system comprises: an heat transfer component configured to modulate (i) between a power-on state where heat energy is being generated and a power-off state where heat energy is not being generated or (ii) between a power-on state where heat energy is being removed and a power-off-state where heat energy is not being removed, a surface element of the vehicle component, the surface element being formed of a material to be heated by the heat energy generated and provided by the heat transfer component or to be cooled by the heat energy removed by the heat transfer component, and a control system configured to: determine a heating lag time indicative of a lag time for the surface element to heat to a first target temperature in response to a power on-off or power off-on modulation of the heat transfer component, determine a cooling lag time indicative of a lag time for the surface element to cool to a second target temperature in response to a power on-off or power off-on modulation of the heat transfer component, and control power-off and power-on times of the heat transfer component based on the determined heating and cooling lag times so as to not require a temperature sensor for feedback-based temperature control.

In some implementations, the heat transfer component is configured to generate and provide heat energy to the surface element while in the power-on state and to not generate or provide heat energy to the surface element while in the power-off state, the heating lag time is determined as the lag time for the surface element to heat to the first target temperature in response to the power off-on modulation of the heat transfer component, and the cooling lag time is determined as the lag time for the surface element to cool to the second target temperature in response to the power on-off modulation of the heat transfer component. In some implementations, the control system is configured to set a minimum power-on time of the heat transfer component based on the determined heating lag time and to set a maximum power-off time of the heat transfer component based on the determined cooling lag time. In some implementations, the minimum power-on and maximum power-off times provide for a desired amount of surface element temperature heating and cooling during modulation between power-on and power-off states of the heat transfer component, and wherein the desired amount of surface element temperature heating and cooling is sufficient to maintain a stable temperature of the surface element within a desired temperature range. In some implementations, the heated surface component of the vehicle is one of a heated mirror, a heated glass panel, a heated seat, and a heated steering wheel.

In some implementations, the heat transfer component is configured to remove heat energy from the surface element while in the power-on state and to not remove heat energy from the surface element while in the power-off state, the heating lag time is determined as the lag time for the surface element to heat to the first target temperature in response to the power on-off modulation of the heat transfer component, and the cooling lag time is determined as the lag time for the surface element to cool to the second target temperature in response to the power off-on modulation of the heat transfer component. In some implementations, the control system is configured to set a maximum power-off time of the heat transfer component based on the determined heating lag time and to set a minimum power-on time of the heat transfer component based on the determined cooling lag time. In some implementations, the minimum power-on and maximum power-off times provide for a desired amount of surface element temperature heating and cooling during modulation between power-on and power-off states of the heat transfer component, and wherein the desired amount of surface element temperature heating and cooling is sufficient to maintain a stable temperature of the surface element within a desired temperature range. In some implementations, the cooled surface component of the vehicle is one of a cooled seat, a cooled steering wheel, a cooled battery pack, and a cooled power inverter.

According to another example aspect of the invention, an energy management method for heating or cooling a surface of a component of a vehicle is presented. In one exemplary implementation, the method comprises: determining, by a control system, a heating lag time indicative of a lag time for a surface element of the vehicle component to heat to a first target temperature in response to a power on-off or power off-on modulation of a heat transfer component, wherein the heat transfer component is configured to modulate (i) between a power-on state where heat energy is being generated and a power-off state where heat energy is not being generated or (ii) between a power-on state where heat energy is being removed and a power-off state where heat energy is not being removed, and wherein the surface element is formed of a material to be heated by the heat energy generated and provided by the heat transfer component or to be cooled by the heat energy removed by the heat transfer component, determining, by the control system, a cooling lag time indicative of a lag time for the surface element to cool to a second target temperature in response to a power on-off or power off-on modulation of the heat transfer component, and controlling, by the control system, power-on and power-off times of the heat transfer component based on the determined heating and cooling lag times so as to not require a temperature sensor for feedback-based temperature control.

In some implementations, the heat transfer component is configured to generate and provide heat energy to the surface element while in the power-on state and to not generate or provide heat energy to the surface element while in the power-off state, the heating lag time is determined as the lag time for the surface element to heat to the first target temperature in response to the power off-on modulation of the heat transfer component, and the cooling lag time is determined as the lag time for the surface element to cool to the second target temperature in response to the power on-off modulation of the heat transfer component. In some implementations, controlling the power-on and power-off times of the heat transfer component comprises setting a minimum power-on time of the heat transfer component based on the determined heating lag time and setting a maximum power-off time of the heat transfer component based on the determined cooling lag time. In some implementations, the minimum power-on and maximum power-off times provide for a desired amount of surface element temperature heating and cooling during modulation between power-on and power-off states of the heat transfer component, and wherein the desired amount of surface element temperature heating and cooling is sufficient to maintain a stable temperature of the surface within a desired temperature range. In some implementations, the heated surface component of the vehicle is one of a heated mirror, a heated glass panel, a heated seat, and a heated steering wheel.

In some implementations, the heat transfer component is configured to remove heat energy from the surface element while in the power-on state and to not remove heat energy from the surface element while in the power-off state, the heating lag time is determined as the lag time for the surface element to heat to the first target temperature in response to the power on-off modulation of the heat transfer component, and the cooling lag time is determined as the lag time for the surface element to cool to the second target temperature in response to the power off-on modulation of the heat transfer component. In some implementations, controlling the power-on and power-off times of the heat transfer component comprises setting a maximum power-off time of the heat transfer component based on the determined heating lag time and setting a minimum power-on time of the heat transfer component based on the determined cooling lag time. In some implementations, the minimum power-on and maximum power-off times provide for a desired amount of surface element temperature heating and cooling during modulation between power-on and power-off states of the heat transfer component, and wherein the desired amount of surface element temperature heating and cooling is sufficient to maintain a stable temperature of the surface element within a desired temperature range. In some implementations, the cooled surface component of the vehicle is one of a cooled seat, a cooled steering wheel, a cooled battery pack, and a cooled power inverter.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, conventional vehicle heat transfer devices command a heat transfer component (an electrical heating element, a cooling compressor/pump, a cooling fan, etc.) to generate and provide heat energy to or remove heat energy from a surface material. For a heated surface device, for example, an electrical heating element may be commanded to generate heat energy equal to a target temperature of the surface material. This approach consumes energy directly proportional to the power of the electrical heating element and the time the electrical heating element is active or "powered on" and thus could result in excessive power consumption. The same could also be true for cooled surface devices. One or more temperature sensors could be implemented to perform closed-loop feedback-based temperature control, but these sensors increase costs. Accordingly, an improved vehicle heat transfer device and an energy management method for the same are presented. The improved techniques implemented by these systems and methods involve initially determining heating and cooling lag times, which are indicative of times for the surface material to change temperature by a certain amount in response to power-on to power-off transitions or vice-versa. Once determined, the heating and cooling lag times are utilized to optimally control power-on and power-off times of the heat transfer component. In a heated surface implementation, a minimum power-on time could be set based on the heating lag time and a maximum power-off time could be set based on the cooling lag time. Conversely, in a cooled surface implementation, a minimum power-on time could be set based on the cooling lag time and a maximum power-off time could be set based on the heating lag time.

Figure 1:
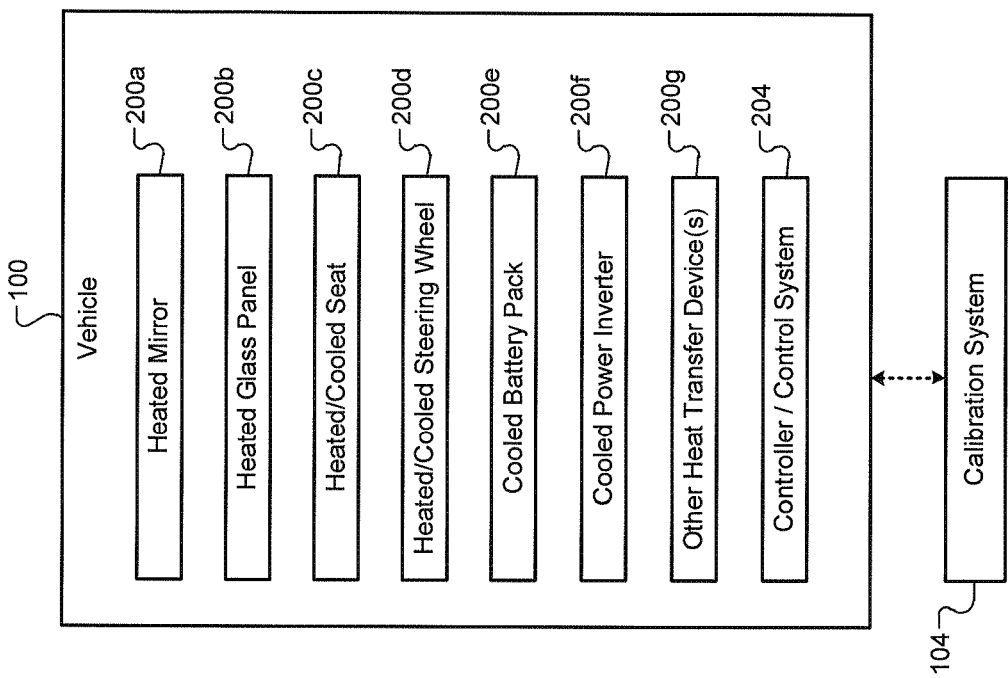
FIG. 1 is a functional block diagram of an example vehicle having one or more heat transfer devices according to the principles of the present disclosure.

Referring now to FIG. 1, a functional block diagram of a vehicle 100 having at least one heat transfer device (generally referred to herein as "heated transfer device(s) 200") is illustrated. As previously discussed herein, it will be appreciated that the term "heat transfer device" comprises both heated surface devices and cooled surface devices. The vehicle 100 includes at least one of a heated mirror 200a, a heated glass panel 200b (a front windshield, a rear windshield or backlight, etc.), a heated or cooled seat 200c, a heated or cooled steering wheel 200d, a cooled battery pack 200e, a cooled power inverter 200f, and one or more other heat transfer devices 200g (collectively, "heat transfer device(s) 200) and a controller or control system 204. It will be appreciated that these are non-limiting examples of vehicle heat transfer device(s) 200 and that the techniques of the present disclosure are applicable to any suitable interior or exterior vehicle heat transfer device (headlights, taillights, grilles/radomes, interior door panels, a dash/infotainment system, etc.) or any other vehicle components that require heating or cooling. It will also be appreciated that the vehicle 100 includes a plurality of typical components that are not illustrated (a powertrain, a driveline, etc.). The controller 204 controls operation of the heat transfer device(s) 200. An external calibration system 104 could be utilized, e.g., in conjunction with one or more temperature sensors, to determine the heating and cooling lag times of the heat transfer device(s) 200 (e.g., during vehicle development or calibration), which could then be provided to the controller 104. Alternatively, the controller 204 could initially determine the heating and cooling lag times in a similar manner for later use. The calibration system 104 and/or the controller 204 are also referred to herein as a "system" associated with the vehicle 100 and the heat transfer device(s) 200.

Figure 2:
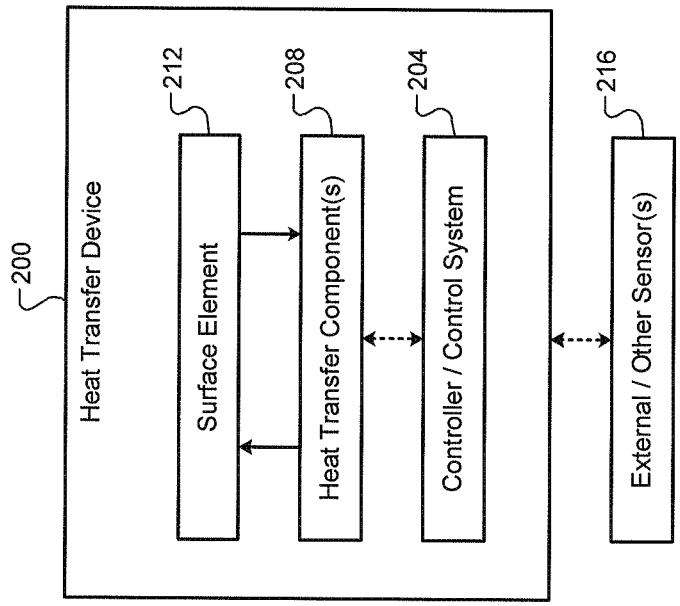
FIG. 2 is a functional block diagram of an example vehicle heat transfer device according to the principles of the present disclosure.

Referring now to FIG. 2, a functional block diagram of an example configuration of one of the heat transfer device(s) 200 (e.g., devices 200a-200g) is illustrated. The heat transfer device 200 comprises the controller 204 and a heat transfer component 208 (or system of components) that is configured to modulate between a power-on state where it generates or removes heat energy (e.g., in response to a provided current) and a power-off state where it does not generate or remove heat energy. The heat transfer component 208 could be any suitable type of electrical heating element (metal, ceramic, semiconductor, thick film, etc.) configured to generate heat energy in response to receiving electrical energy or any suitable type of cooling component/system (a compressor and a pump for a liquid coolant, a fan, etc.) configured to remove heat energy in response to receiving electrical energy. A surface or surface element 212 of the heat transfer device 200 is formed of a non-dynamic or non-changing material (plastic, glass, leather, etc.) that is configured to be heated by the heat energy generated by or cooled by the heat energy removed by the heat transfer component 208. The controller 204 could be integrated into or external to the heat transfer device 200 and is configured to control the heat transfer component 208 (e.g., modulation between power-on and power-off) to control a temperature of the surface 212 as desired. It will be appreciated that the controller 204 could operate based on inputs from one or more external sensors 216 (an ambient temperature sensor, a vehicle seat weight sensor, etc.), which could be part of the heat transfer device 200 or external thereto. As previously described, a surface temperature sensor could be temporarily implemented (e., by calibration system 104 or control system 204) only for the initial heating/cooling lag time determinations. As previously mentioned, however, the techniques of the present disclosure also do not require such surface temperature sensor(s) for closed-loop feedback-based temperature control, thereby saving costs.

Figure 3:
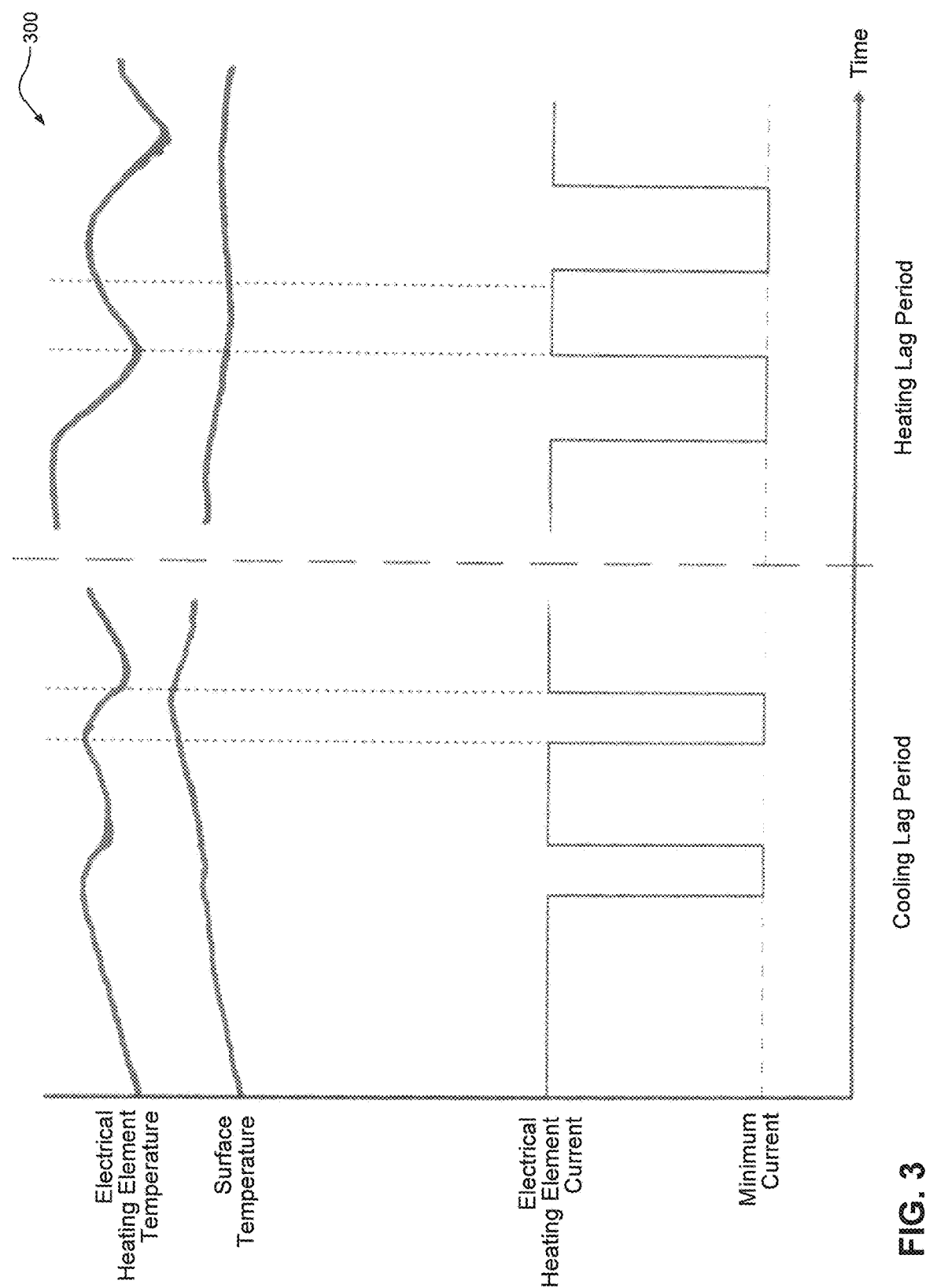
FIG. 3 is a timing diagram illustrating heating and cooling lag time determinations relative to electrical heating element power-on and power-off times according to the principles of the present disclosure.

Referring now to FIG. 3, a timing diagram 300 illustrating heating and cooling lag times for a heated surface configuration of an example vehicle heat transfer device are illustrated. For purposes of describing FIG. 3, the heat transfer component 208 will be temporarily referred to as "electrical heating element 208." In the left portion of FIG. 3, the electrical heating element 208 is initially in a power-on state and its temperature is increasing along with the temperature of the surface 212. As shown, the cooling lag period begins at the second on-off modulation of the electrical heating element 208 (where its current drops to zero or some other minimal level). This cooling lag time represents the amount of time that it takes for the temperature of the surface 212 to begin decreasing or to decrease by a desired amount after the power on-off transition of the electrical heating element 208. In the left portion of FIG. 3, the cooling lag period is illustrated by the two vertical dashed lines. In the right portion of FIG. 3, the electrical heating element 208 initially has a power on-off transition or modulation and its temperature is decreasing along with the temperature of the surface 212. As shown, the heating lag period begins at the first off-on modulation of the electrical heating element 208 (where its current increases from its minimal level to a maximum or full-on level). This heating lag time represents the amount of time that it takes for the temperature of the surface 212 to begin increasing or to increase by a desired amount after the off-on transition of the electrical heating element 208. In the right portion of FIG. 3, the heating lag period is illustrated by the two dashed vertical lines.

It will be appreciated that while the techniques herein are primarily described herein with specific reference to heated surface configurations of the heat transfer device(s) 200, such as in the description above with respect to timing diagram 300 of FIG. 3, the techniques could of the present disclosure are also be applicable to cooled surface configurations of heat transfer devices of vehicles as previously mentioned and illustrated herein (cooled seats, a cooled steering wheel, a cooled battery pack, a cooled power inverter, etc.). For example, heating and cooling lag times for a cooled surface configuration of a heat transfer device having a surface and a suitable heat transfer device configured for cooling or removing heat energy (e.g., a compressor and/or a pump that control a flow of a liquid coolant, or a fan) could be determined and then utilized to control power-on/power-off or other actuation times of the heat transfer component in order to accurately maintain the surface temperature at a desired level or within a desired range. Generic flowcharts for both heated surface and cooled surface configurations of vehicle heat transfer devices are illustrated in FIGS. 4A-4B and will now be described in greater detail.

Figure 4A:
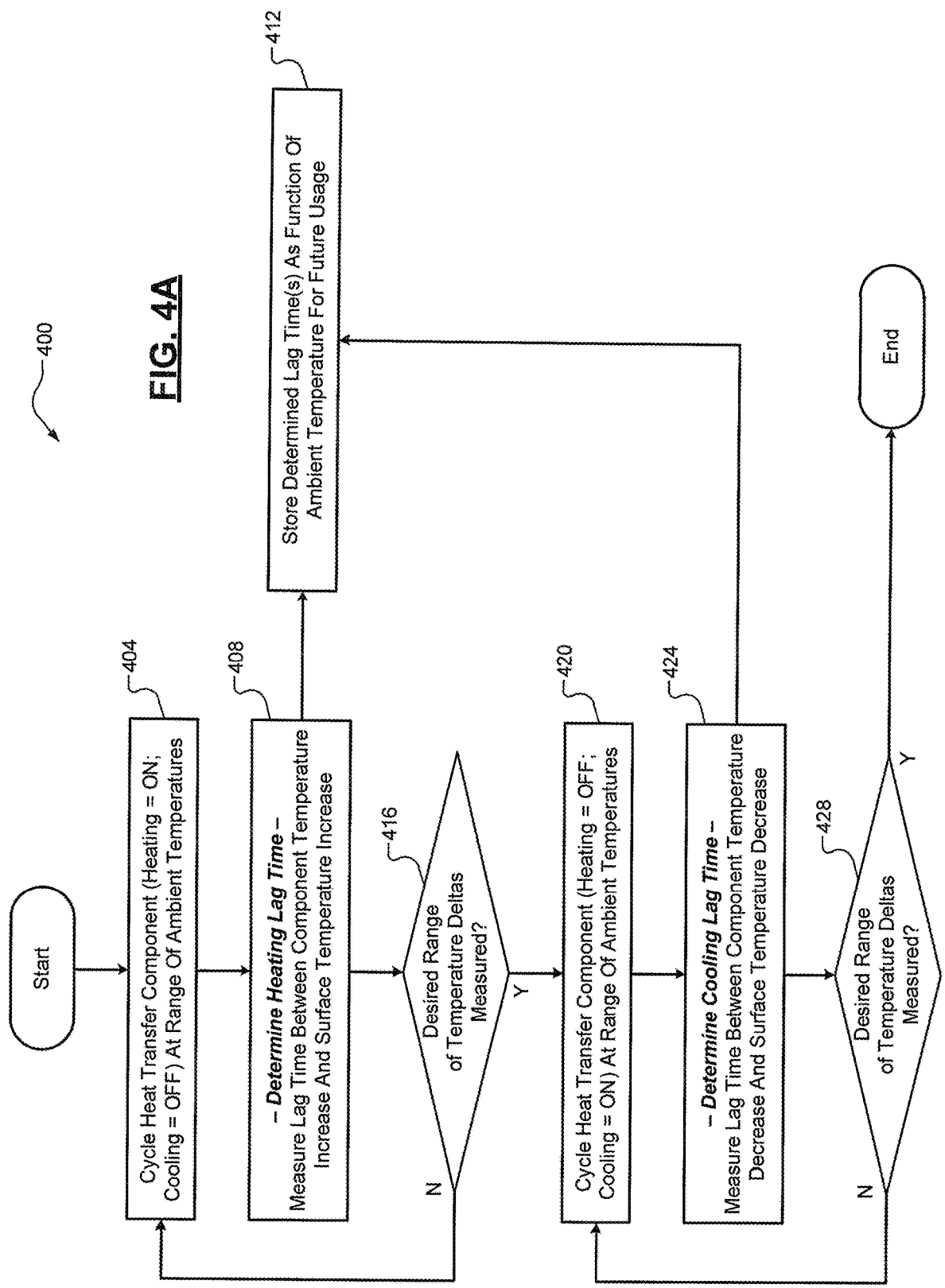
FIGS. 4A-4B are flow diagrams of example energy management methods for heated surface and cooled surface configurations of a vehicle heat transfer device, respectively, according to the principles of the present disclosure.
Figure 4B:
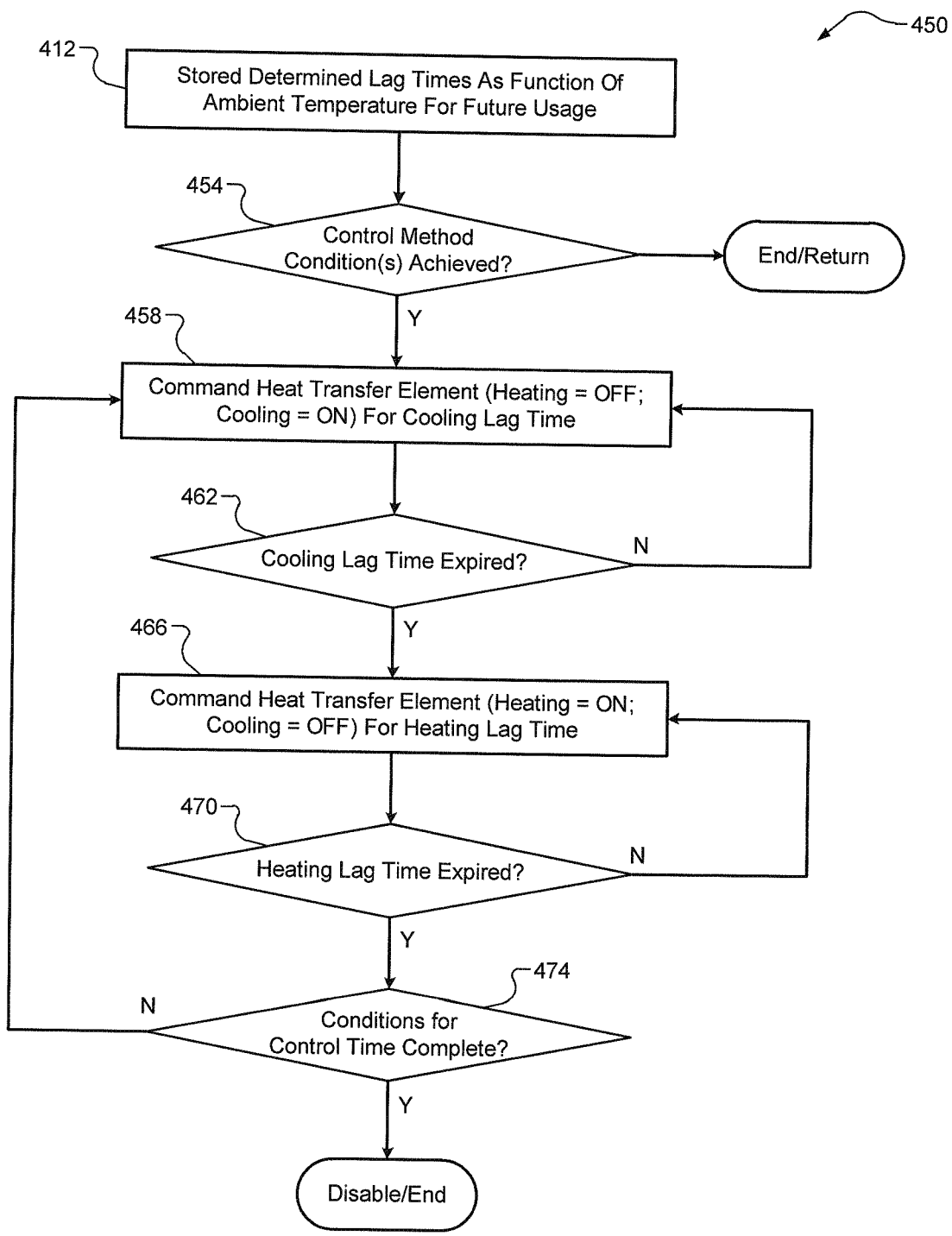

Referring now to FIG. 4A, a flow diagram of a method 400 for establishing or determining heating and cooling lag times for both heated and cooled surface configurations of vehicle heat transfer devices is illustrated. While the method 400 specifically references heat transfer device(s) 200, it will be appreciated that this method 400 could be applicable to any suitable heat transfer device. At 404, the heat transfer component 208 is cycled or modulated at a range of ambient temperatures. For a heated surface configuration, the heat transfer component 208 is commanded to a power-on (ON) state and for a cooled surface configuration, the heat transfer component 208 is commanded to a power-off (OFF) state. At 408, the time interval or delay between a particular temperature increase of the heat transfer component 208 and the same particular temperature increase of the surface 212 is measured to determine the heating lag time. The determined heating lag time is then stored at 412 (e.g., in a datastore or memory of the controller 204) and associated with a particular ambient temperature or range of ambient temperatures. At 416, it is determined whether a desired range of temperature deltas have been measured. When true, the method 400 proceeds to 420. Otherwise, the method 400 returns to 404 for further modulation/measurement/storage.

At 420, the heat transfer component 208 is cycled or modulated at a range of ambient temperatures. This time, for a heated surface configuration, the heat transfer component 208 is commanded to a power-off (OFF) state and for a cooled surface configuration, the heat transfer component 208 is commanded to a power-on (ON) state. At 424, the time interval or delay between a particular temperature decrease of the heat transfer component 208 and the same particular temperature decrease of the surface 212 is measured to determine the cooling lag time. The determined cooling lag time is then stored at 412 and associated with a particular ambient temperature or range of ambient temperatures. At 428, it is determined whether a desired range of temperature deltas have been measured. When true, the method 400 ends. Otherwise, the method 400 returns to 420 for further modulation/measurement/storage.

The following table is merely an example of heating and cooling lag times and the associated data that could be stored at 412 for a heated surface configuration of a vehicle heat transfer device, including ambient temperatures in both degrees) (°) Fahrenheit (F) and Celsius (C) and times in either minutes (min) or seconds (sec).

| Ambient Temp. | Heating Time | Heating Lag Time | Cooling Lag Time |
|---|---|---|---|
| −20° F. (−28.89° C.) | 25 min. | 0 sec. | 0 sec. |
| −10° F. (−23.33° C.) | 20 min. | 15 sec. | 5 sec. |
| −4° F. (−20° C.) | 15 min. | 10 sec. | 5 sec. |
| 0° F. (−17.78° C.) | 10 min. | 10 sec. | 5 sec. |
| 14° F. (−10° C.) | 8 min. | 10 sec. | 5 sec. |
| 25° F. (−3.89° C.) | 6 min. | 10 sec. | 5 sec. |

This stored information could then be utilized to control modulation of the heat transfer component 208 of the heat transfer device(s) 200, which will now be described in greater detail with respect to the flowchart of FIG. 4B.

Referring now to FIG. 4B, a flow diagram of a method 450 for using heating and cooling lag times for both heated and cooled surface configurations of vehicle heat transfer devices is illustrated. While the method 450 specifically references heat transfer device(s) 200, it will be appreciated that this method 400 could be applicable to any suitable heat transfer device. At 412, the stored data from block/step 412 of method 400 (FIG. 4A) is retrieved for usage. At 454, it is determined whether conditions for performing the control method have been achieved. This could include, for example only, a sufficient amount of data having been obtained and stored at 412 in order to properly control modulation of the heat transfer component 208. When true, the method 450 proceeds to 458. Otherwise, the method 450 ends or returns (e.g., to method 400 of FIG. 4A, to obtain additional data). At 458, the heat transfer component 208 is commanded for the cooling lag time. For a heated surface configuration, the heat transfer component 208 is commanded to a power-off (OFF) state and for a cooled surface configuration, the heat transfer component 208 is commanded to a power-on (ON) state.

At 462, it is determined whether the cooling lag time has expired (e.g., a corresponding timer). When true, the method 450 proceeds to 466. Otherwise, the method 450 returns to 458. At 466, the heat transfer component is commanded for the heating lag time. This time, for a heated surface configuration, the heat transfer component 208 is commanded to a power-on (ON) state and for a cooled surface configuration, the heat transfer component 208 is commanded to a power-off (OFF) state. At 470, it is determined whether the heating lag time has expired (e.g., a corresponding timer). When true, the method 450 proceeds to 474. Otherwise, the method 450 returns to 466. At 474, it is determined whether conditions for the control time have completed. This could include, for example only, a certain number of cycles or iterations having been performed, or a heating/cooling request for the vehicle heat transfer device being withdrawn or otherwise disabled by a driver of the vehicle. When true, the method 450 is disabled or ends. When false, however, the process continues and the method 450 returns to 458.

While heated surface and cooled surface configurations are described as separate or distinct configurations herein, it will be appreciated that a vehicle heat transfer device could have both heated surface and cooled surface configurations (e.g., a heated and cooled vehicle seat) and thus could determine separate sets of heating and cooling lag times for two different heat transfer components/systems. When operating in a heating mode, one set of heating/cooling lag times could be utilized and when operating in a cooling mode, another different set of heating/cooling lag times could be utilized. These heating/cooling lag times could differ because the heat energy generated by and the heat energy removed by the different heat transfer components could occur at different rates.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A system for heating or cooling a surface of a component of a vehicle, the system comprising:
 a heat transfer component configured to modulate (i) between a power-on state where heat energy is being generated and a power-off state where heat energy is not being generated or (ii) between a power-on state where heat energy is being removed and a power-off state where heat energy is not being removed;
 a surface element of the vehicle component, the surface element being formed of a material to be heated by the heat energy generated and provided by the heat transfer component or to be cooled by the heat energy removed by the heat transfer component; and
 a control system configured to:
  determine a heating lag time indicative of a lag time for the surface element to heat to a first target temperature in response to a first power on-off or power off-on modulation of the heat transfer component;
  determine a cooling lag time indicative of a lag time for the surface element to cool to a second target temperature in response to a second power on-off or power off-on modulation of the heat transfer component; and
  control power-off and power-on times of the heat transfer component based on the determined heating and cooling lag times so as to perform feedback-based temperature control without requiring a temperature sensor.

2. The system of claim 1, wherein:
the heat transfer component is configured to generate and provide heat energy to the surface element while in the power-on state and to not generate or provide heat energy to the surface element while in the power-off state;
the heating lag time is determined as the lag time for the surface element to heat to the first target temperature in response to the first power off-on modulation of the heat transfer component; and
the cooling lag time is determined as the lag time for the surface element to cool to the second target temperature in response to the second power on-off modulation of the heat transfer component.

3. The system of claim 2, wherein the control system is configured to set a minimum power-on time of the heat transfer component based on the determined heating lag time and to set a maximum power-off time of the heat transfer component based on the determined cooling lag time.

4. The system of claim 3, wherein the minimum power-on and maximum power-off times provide for a desired amount of surface element temperature heating and cooling during modulation between power-on and power-off states of the heat transfer component, and wherein the desired amount of surface element temperature heating and cooling is sufficient to maintain a stable temperature of the surface element within a desired temperature range.

5. The system of claim 2, wherein the vehicle component is one of a heated mirror, a heated glass panel, a heated seat, and a heated steering wheel.

6. The system of claim 1, wherein:
the heat transfer component is configured to remove heat energy from the surface element while in the power-on state and to not remove heat energy from the surface element while in the power-off state;
the heating lag time is determined as the lag time for the surface element to heat to the first target temperature in response to the first power on-off modulation of the heat transfer component; and
the cooling lag time is determined as the lag time for the surface element to cool to the second target temperature in response to the second power off-on modulation of the heat transfer component.

7. The system of claim 6, wherein the control system is configured to seta maximum power-off time of the heat transfer component based on the determined heating lag time and to set a minimum power-on time of the heat transfer component based on the determined cooling lag time.

8. The system of claim 7, wherein the minimum power-on and maximum power-off times provide for a desired amount of surface element temperature heating and cooling during modulation between power-on and power-off states of the heat transfer component, and wherein the desired amount of surface element temperature heating and cooling is sufficient to maintain a stable temperature of the surface element within a desired temperature range.

9. The system of claim 6, wherein the vehicle component is one of a cooled seat, a cooled steering wheel, a cooled battery pack, and a cooled power inverter.

* * * * *